US007671853B2

(12) United States Patent
Morita

(10) Patent No.: US 7,671,853 B2
(45) Date of Patent: Mar. 2, 2010

(54) SIGNAL OUTPUT ADJUSTMENT CIRCUIT AND DISPLAY DRIVER

(75) Inventor: Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1606 days.

(21) Appl. No.: 10/912,247

(22) Filed: Aug. 6, 2004

(65) Prior Publication Data

US 2005/0062733 A1 Mar. 24, 2005

(30) Foreign Application Priority Data

Sep. 2, 2003 (JP) ............................ 2003-310534

(51) Int. Cl.
*G09G 5/00* (2006.01)
*G06F 3/038* (2006.01)

(52) U.S. Cl. ...................................................... 345/211

(58) Field of Classification Search ........... 345/30–111, 345/211–213

See application file for complete search history.

(56) References Cited

U.S. PATENT DOCUMENTS 6,330,651 B1 * 12/2001 Kawaguchi et al. ......... 711/167
6,927,776 B2 * 8/2005 Mino et al. ................. 345/538
6,930,800 B1 * 8/2005 Adachi et al. .............. 358/3.13

FOREIGN PATENT DOCUMENTS

CN 1301363 A 6/2001
JP A 05-333805 12/1993
JP A 11-127303 5/1999
JP A 2001-339377 12/2001
JP A 2002-062840 2/2002
JP A 2002-185806 6/2002
JP A 2003-241730 8/2003
WO WO 99/47999 A1 9/1999

OTHER PUBLICATIONS

U.S. Appl. No. 10/913,526, filed Aug. 9, 2004, Morita.
U.S. Appl. No. 10/913,464, filed Aug. 9, 2004, Morita.
U.S. Appl. No. 10/928,174, filed Aug. 30, 2004, Morita.
U.S. Appl. No. 10/913,526, filed Aug. 9, 2004, Morita.
U.S. Appl. No. 10/913,464, filed Aug. 9, 2004, Morita.
U.S. Appl. No. 10/928,174, filed Aug. 30, 2004, Morita.

* cited by examiner

*Primary Examiner*—Srilakshmi K Kumar
(74) *Attorney, Agent, or Firm*—Oliff & Berridge, PLC

(57) ABSTRACT

A signal output adjustment circuit includes a decoder which decodes command data from a memory, a control register in which control data corresponding to first command data is set when the decoder determines that the command data is the first command data, a buffer in which the control data corresponding to second command data is stored when the decoder determines that the command data is the second command data, and an output adjustment circuit which reads the control data stored in the buffer and outputs the control data in synchronization with a data fetch signal, based on a value set in the control register. At least one of permission/rejection of inversion output of the data fetch signal and output timing of the data fetch signal is set based on the value set in the control register.

14 Claims, 19 Drawing Sheets

FIG. 8

| COMMAND | DS | D(S-1) | ------- | D2 | D1 | D0 | |
|---|---|---|---|---|---|---|---|
| ⋮ | 0 | 0 | | 0 | 0 | 0 | |
| | 0 | 0 | ------- | 0 | 0 | 1 | |
| | ⋮ | ⋮ | | ⋮ | ⋮ | ⋮ | |
| POWER SUPPLY OUTPUT COMMAND | 0 | 1 | | 0 | 0 | 0 | SIGNAL OUTPUT COMMAND |
| VCOM SETTING COMMAND | 0 | 1 | ------- | 0 | 0 | 1 | |
| ⋮ | ⋮ | ⋮ | | ⋮ | ⋮ | ⋮ | |
| ⋮ | ⋮ | ⋮ | ⋮ | ⋮ | ⋮ | ⋮ | |
| REFERENCE CLOCK SETTING COMMAND | 1 | 0 | ------- | 0 | 0 | 0 | OUTPUT ADJUSTMENT COMMAND |
| FREQUENCY DIVIDED CLOCK SETTING COMMAND | 1 | 0 | ------- | 0 | 0 | 1 | |
| CLOCK PHASE SELECTION COMMAND | 1 | 0 | ------- | 0 | 1 | 0 | |
| CLOCK OUTPUT LOGIC LEVEL SETTING COMMAND | 1 | 0 | ------- | 0 | 1 | 1 | |
| CLOCK OUTPUT SETTING COMMAND | 1 | 0 | ------- | 1 | 0 | 0 | |
| DATA PHASE SELECTION COMMAND | 1 | 0 | ------- | 1 | 0 | 1 | |
| DATA FETCH SIGNAL LOGIC LEVEL SETTING COMMAND | 1 | 0 | ------- | 1 | 1 | 0 | |
| DATA OUTPUT SETTING COMMAND | 1 | 0 | ------- | 1 | 1 | 1 | |
| ⋮ | ⋮ | ⋮ | ⋮ | ⋮ | ⋮ | ⋮ | |

FIG. 15

| DIV | CLA | CLB |
|---|---|---|
| 1 | CK | CK/4 |
| 2 | CK/2 | CK/8 |
| 4 | CK/4 | CK/16 |

SIGNAL OUTPUT ADJUSTMENT CIRCUIT AND DISPLAY DRIVER

Japanese Patent Application No. 2003-310534, filed on Sep. 2, 2003, is hereby incorporated by reference in its entirety.

BACKGROUND OF THE INVENTION

The present invention relates to a signal output adjustment circuit and a display driver.

An electro-optical device represented by a liquid crystal display device includes an electro-optical panel which includes a plurality of data lines and a plurality of scan lines. A scan line of the electro-optical panel is scanned by a scan driver, and a data line of the electro-optical panel is driven by a data driver. The electro-optical device may include a power supply circuit which provides a power supply to the electro-optical panel, the data driver, and the scan driver. As described above, the electro-optical device is formed by a plurality of devices, and these devices are electrically connected through interconnects.

BRIEF SUMMARY OF THE INVENTION

According to one aspect of the present invention, there is provided a signal output adjustment circuit which adjusts output of control data corresponding to command data, the signal output adjustment circuit comprising:

a decoder which decodes the command data read from a memory;

a control register in which control data corresponding to first command data is set when the decoder determines that the command data is the first command data for setting control data;

a buffer in which control data corresponding to second command data is stored when the decoder determines that the command data is the second command data for outputting control data; and an output adjustment circuit which reads the control data stored in the buffer and outputs the read control data in synchronization with a data fetch signal, based on a value set in the control register, wherein the output adjustment circuit sets at least one of permission/rejection of inversion output of the data fetch signal and output timing of the data fetch signal, based on the value set in the control register.

According to another aspect of the present invention, there is provided a signal output adjustment circuit which adjusts output of a clock signal, the signal output adjustment circuit comprising:

a decoder which decodes command data read from a memory;

a control register in which control data corresponding to the command data is set based on a decoding result of the decoder; and an output adjustment circuit which outputs a clock signal based on a value set in the control register, wherein the output adjustment circuit outputs the clock signal of which at least one of frequency, phase, permission/rejection of inversion output, and output timing is set based on the value set in the control register.

According to a further aspect of the present invention, there is provided a display driver which drives a data line of an electro-optical device based on display data, the display driver comprising:

a data register which fetches the display data based on a given dot clock signal, the display data being serially input in pixel units in synchronization with the dot clock signal;

a line latch which latches the display data fetched by the data register based on a horizontal synchronization signal which determines one horizontal scan period;

a data line driver circuit which drives the data line based on the display data latched by the line latch; and one of the above described signal output adjustment circuits, wherein one of the reference clock signals is one of the dot clock signal, the horizontal synchronization signal, and a vertical synchronization signal which determines one vertical scan period.

BRIEF DESCRIPTION OF THE SEVERAL VIEWS OF THE DRAWING

FIG. 8 is a view showing an example of command data.

FIG. 15 is a view showing a truth table of an operation example of a frequency divided clock selection circuit.

DETAILED DESCRIPTION OF THE EMBODIMENT

Figure 1:
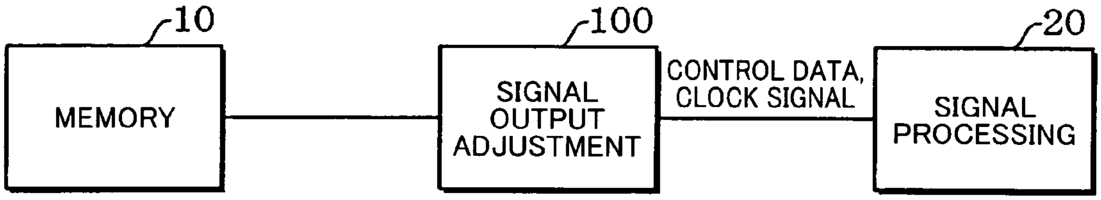
FIG. 1 is a schematic diagram of the connection relationship of a signal output adjustment circuit in an embodiment of the present invention.

Embodiments of the present invention are described below. Note that the embodiments described below do not limit the scope of the invention defined by the claims laid out herein. In addition, not all of the elements of the embodiments described below should be taken as essential requirements of the present invention.

In the case where each device is formed as a semiconductor chip, the input or output interface specification generally differs depending on the manufacturer. Therefore, in the case of forming an electro-optical device using a plurality of devices, it is generally necessary to select devices manufactured by the same manufacturer so that the interface specification is the same. Therefore, it is desirable that the manufacturer of each device provides a device which can absorb the difference in the interface specification.

In the case of absorbing the difference in the interface specification, a timing adjustment circuit including a register which stores a timing regulation value, a counter, a comparison circuit, and a latch circuit may be used. In this timing adjustment circuit, the comparison circuit compares the counter value of the counter with the timing regulation value stored in the register. The latch circuit latches data output from the unit in the preceding stage based on the comparison result, and outputs the latched data. This enables timing regulation of data to be realized, whereby data can be transferred between two devices having different interface specifications without causing errors to occur.

However, the above-described timing adjustment circuit adjusts only the timing of data transferred between the two devices. The interface specification of the device specifies a positive logic or negative logic, phase, output timing, and the like other than DC characteristics dependent on the circuit. If even one of the interface specifications differs, data cannot be transferred without causing errors to occur. Therefore, the above-described timing adjustment circuit may not allow data to be transferred between two devices without causing errors to occur.

A data driver (display driver in a broad sense), a scan driver, and a power supply circuit for driving the electro-optical device are controlled by a display controller. In this case, the data driver may set control data to the scan driver or the power supply circuit based on command data read from an external memory or command data set by the display controller. Therefore, it is desirable that the data driver be able to absorb the difference in the interface specification between the data driver and the scan driver or the power supply circuit.

According to the following embodiments, a signal output adjustment circuit and a display driver for providing a generalized device by absorbing the difference in AC characteristics from other devices can be provided.

According to one embodiment of the present invention, there is provided a signal output adjustment circuit which adjusts output of control data corresponding to command data, the signal output adjustment circuit comprising:

a decoder which decodes the command data read from a memory;

a control register in which control data corresponding to first command data is set when the decoder determines that the command data is the first command data for setting control data;

a buffer in which control data corresponding to second command data is stored when the decoder determines that the command data is the second command data for outputting control data; and an output adjustment circuit which reads the control data stored in the buffer and outputs the read control data in synchronization with a data fetch signal, based on a value set in the control register, wherein the output adjustment circuit sets at least one of permission/rejection of inversion output of the data fetch signal and output timing of the data fetch signal, based on the value set in the control register.

In the embodiment of the present invention, the first command data and the second command data are stored in the memory in advance, and the first and second command data are read from the memory. The decoder decodes the command data, and sets the control data corresponding to the decoded command data in the control register or the buffer. The output adjustment circuit outputs the control data read from the buffer in synchronization with the data fetch signal of which at least one of permission/rejection of inversion output and output timing is set based on the value set in the control register. This enables the signal output adjustment circuit to change switching of the positive logic or negative logic and the output timing of the control data. Therefore, the control data can be supplied corresponding to the input interface specification of a circuit to which the control data is supplied. Therefore, a generalized device can be provided by changing the output interface specification of a device including the signal output adjustment circuit.

In the signal output adjustment circuit, the output adjustment circuit may include:

a data phase selection circuit which selects one of a plurality of phase clock signals of different phases based on the value set in the control register;

a data-signal-output-logic-level conversion circuit which outputs the one of the phase clock signals selected by the data phase selection circuit or an inverted signal of the selected phase clock signal, based on the value set in the control register; and a data output control circuit which generates the data fetch signal by delaying output from the data-signal-output-logic-level conversion circuit for a period corresponding to the value set in the control register.

According to the embodiment of the present invention, the above-described effects can be obtained with a simple configuration.

In the signal output adjustment circuit, the data fetch signal may be a signal in synchronization with a given clock signal, and the output adjustment circuit may output the clock signal of which at least one of frequency, phase, permission/rejection of inversion output, and output timing is set based on the value set in the control register.

In the embodiment of the present invention, the frequency, phase, permission/rejection of inversion output, and output timing of the clock signal with which the data fetch signal is in synchronization is set based on the value set in the control register, and the clock signal is output. This enables the output interface specification of the control data to be changed corresponding to the supply target of the clock signal, whereby a generalized device can be provided by changing the output interface specification of a device including the signal output adjustment circuit.

According to another embodiment of the present invention, there is provided a signal output adjustment circuit which adjusts output of a clock signal, the signal output adjustment circuit comprising:

a decoder which decodes command data read from a memory;

a control register in which control data corresponding to the command data is set based on a decoding result of the decoder; and an output adjustment circuit which outputs a clock signal based on a value set in the control register, wherein the output adjustment circuit outputs the clock signal of which at least one of frequency, phase, permission/ rejection of inversion output, and output timing is set based on the value set in the control register.

In the embodiment of the present invention, the command data is stored in the memory in advance, and the command data is read from the memory. The decoder decodes the command data, and the control data corresponding to the decoded command data is set in the control register or the buffer. The output adjustment circuit sets at least one of the frequency, phase, permission/rejection of inversion output, and output timing of the clock signal based on the value set in the control register, and outputs the clock signal. This enables the timing of the clock signal to be changed corresponding to the supply target, whereby the device which includes the signal output adjustment circuit and supplies the clock signal of which the output is adjusted as described above can be generalized.

In the signal output adjustment circuit, the output adjustment circuit may include:

a clock phase selection circuit which selects one of a plurality of phase clock signals of different phases based on the value set in the control register;

a clock-output-logic-level conversion circuit which outputs the one of the phase clock signals selected by the clock phase selection circuit or an inverted signal of the selected phase clock signal, based on the value set in the control register; and a clock output circuit which delays output from the clock-output-logic-level conversion circuit for a period corresponding to the value set in the control register, and outputs the delayed output as the clock signal.

According to the embodiment of the present invention, the above-described effects can be obtained with a simple configuration.

In the signal output adjustment circuit, the output adjustment circuit may include:

a reference clock selection circuit which selects one of a plurality of reference clock signals having different frequencies based on the value set in the control register; and an N-phase clock generation circuit (N is an integer of two or more) which generates N-phase clock signals of different phases based on a frequency-divided clock signal generated by dividing a frequency of the one of the reference clock signals selected by the reference clock selection circuit, and the N-phase clock signals generated by the N-phase clock generation circuit may be supplied to the reference clock selection circuit or the data phase selection circuit.

According to the embodiment of the present invention, the N-phase clock signals can be generated with a simple configuration.

In the signal output adjustment circuit, the N-phase clock generation circuit may generate the N-phase clock signals of different phases based on the frequency-divided clock signal generated by dividing the frequency of the one of the reference clock signals selected by the reference clock selection circuit at a dividing ratio which is set based on the value set in the control register.

According to the embodiment of the present invention, since the variation of the N-phase clock signals can be increased, the interface specification can be changed more minutely.

In the signal output adjustment circuit, the memory may be a nonvolatile memory.

According to the embodiment of the present invention, control can be simplified by performing the above-described output regulation by using the command data at the time of initialization or the like, whereby the device including the signal output adjustment circuit can be further generalized.

According to a further embodiment of the present invention, there is provided a display driver which drives a data line of an electro-optical device based on display data, the display driver comprising:

a data register which fetches the display data based on a given dot clock signal, the display data being serially input in pixel units in synchronization with the dot clock signal;

a line latch which latches the display data fetched by the data register based on a horizontal synchronization signal which determines one horizontal scan period;

a data line driver circuit which drives the data line based on the display data latched by the line latch; and one of the above described signal output adjustment circuits, wherein one of the reference clock signals is one of the dot clock signal, the horizontal synchronization signal, and a vertical synchronization signal which determines one vertical scan period.

In the display driver, the output adjustment circuit may output the control data or the clock signal to at least one of a power supply circuit which provides a power supply of the electro-optical device and a scan driver which scans a scan line of the electro-optical device.

According to the embodiment of the present invention, a display driver which can be applied to an electro-optical device on which a power supply circuit or scan driver is mounted irrespective of the input interface specification of the power supply circuit or the scan driver can be provided. This reduces cost of the display driver and also reduces cost of the electro-optical device to which the display driver is applied.

The embodiments of the present invention are described below in detail with reference to the drawings.

1. Signal Output Adjustment Circuit

FIG. 1 shows a schematic diagram of the connection relationship of a signal output adjustment circuit in the present embodiment.

A signal output adjustment circuit 100 in the present embodiment adjusts output of control data or output of a clock signal which is generated based on command data based on the command data stored in a memory 10. The control data is data corresponding to the command data. The adjusted control data or clock signal is supplied to a signal processing circuit 20. The signal processing circuit 20 performs given processing based on the control data or clock signal supplied from the signal output adjustment circuit 100. This enables the output interface specification of the signal output adjustment circuit 100 to conform to the input interface specification of the signal processing circuit 20, whereby a semiconductor device (device or IC) including the signal output adjustment circuit 100 can be provided with versatility.

FIGS. 2A, 2B, 2C, and 2D show schematic diagrams of a configuration example of a semiconductor device including the signal output adjustment circuit 100. Sections the same as the sections shown in FIG. 1 are denoted by the same symbols. Description of these sections is appropriately omitted.

Figure 2A:
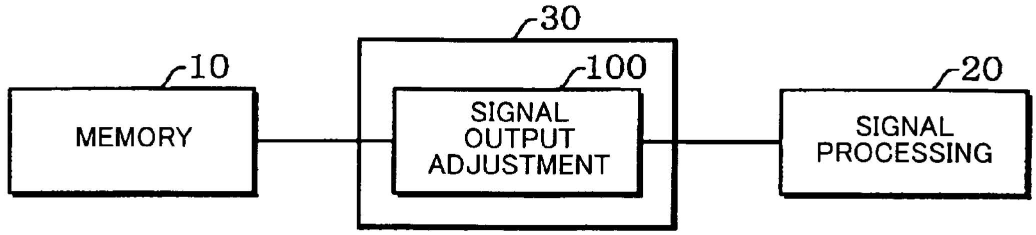
FIGS. 2A, 2B, 2C, and 2D are schematic diagrams of a configuration example of a semiconductor device including a signal output adjustment circuit.
Figure 2B:
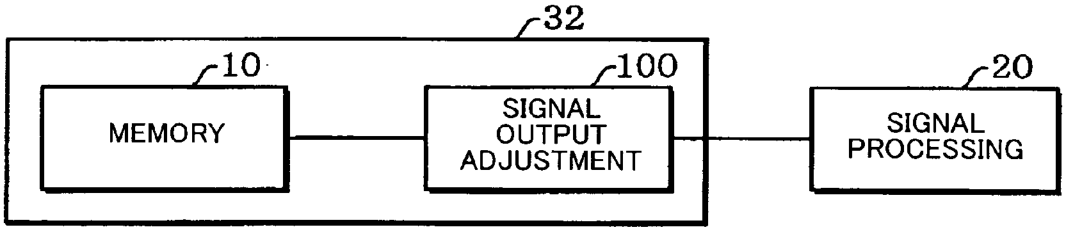
Figure 2C:
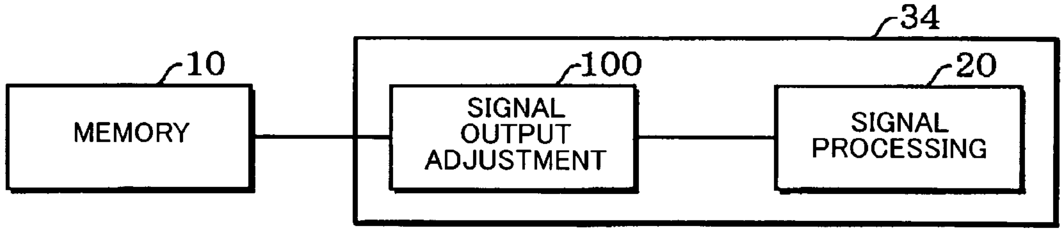
Figure 2D:
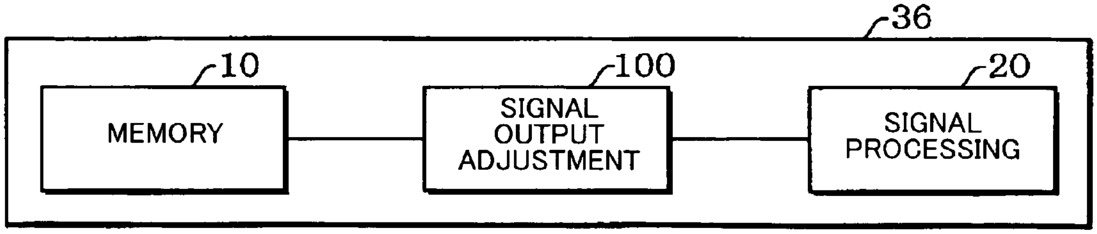

In FIG. 2A, a semiconductor device 30 includes the signal output adjustment circuit 100. In this case, the signal output adjustment circuit 100 is connected with the memory 10 and the signal processing circuit 20 provided outside the semiconductor device 30. In FIG. 2B, a semiconductor device 32 includes the signal output adjustment circuit 100 and the memory 10. In this case, the signal output adjustment circuit 100 is connected with the signal processing circuit 20 provided outside the semiconductor device 32. In FIG. 2C, a semiconductor device 34 includes the signal output adjustment circuit 100 and the signal processing circuit 20. In this case, the signal output adjustment circuit 100 is connected with the memory 10 provided outside the semiconductor device 34. In FIG. 2D, a semiconductor device 36 includes the signal output adjustment circuit 100, the memory 10, and the signal processing circuit 20. In FIGS. 2C and 2D, in the case where the signal processing circuit 20 is macronized and the interface specification is fixed, interface design can be simplified by using the signal output adjustment circuit 100.

Figure 3:
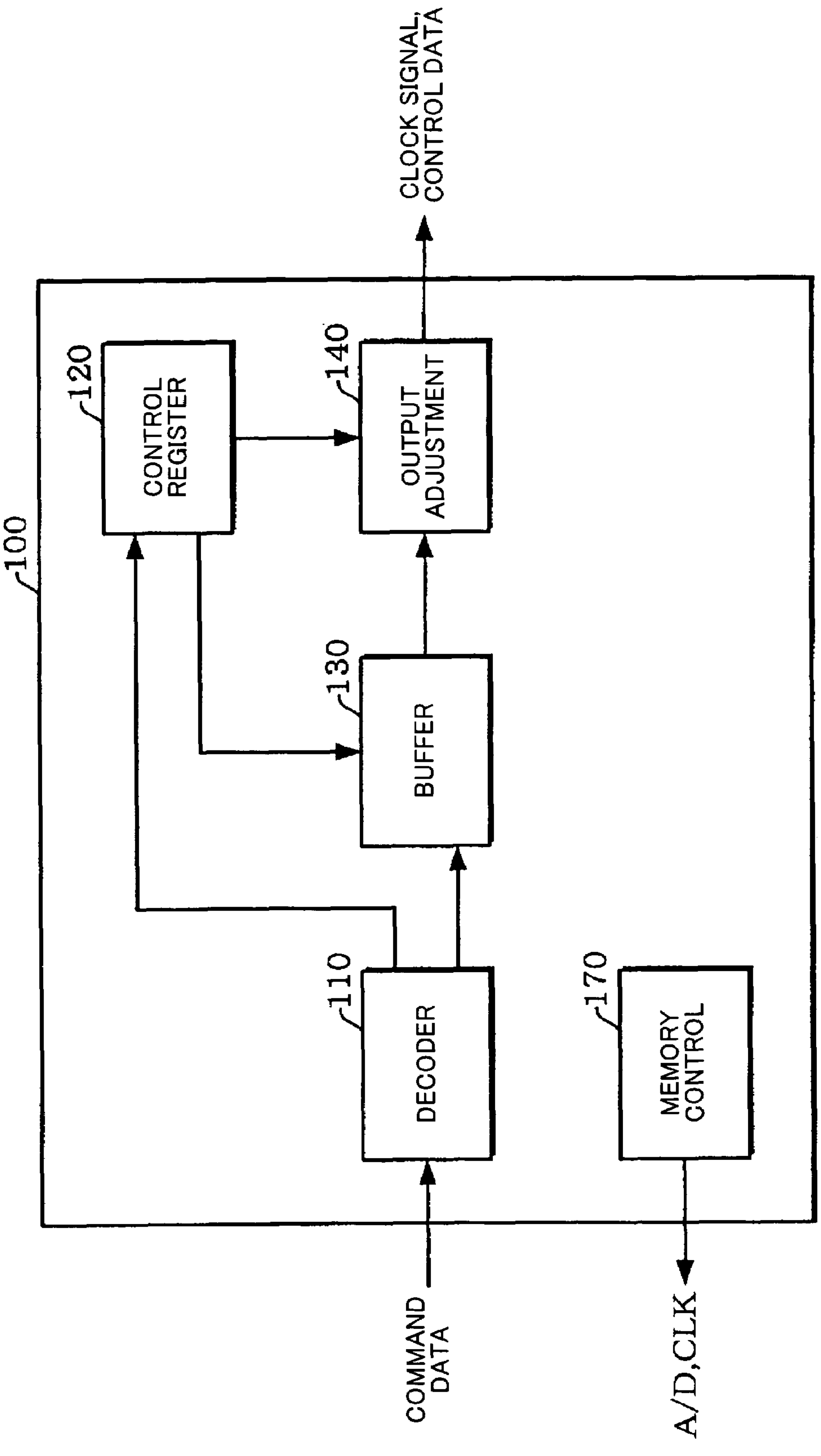
FIG. 3 is a block diagram of an outline of a configuration of a signal output adjustment circuit in an embodiment of the present invention.

FIG. 3 shows an outline of a configuration of the signal output adjustment circuit 100 in the present embodiment.

The signal output adjustment circuit 100 includes a decoder 110, a control register 120, a buffer 130, and an output adjustment circuit 140. The command data is stored in advance in the memory 10 connected with the signal output adjustment circuit 100. The command data includes first command data for setting the control data in the signal output adjustment circuit 100, and second command data for outputting the control data to the signal processing circuit 20.

The decoder 110 decodes the command data read from the memory 10. The control register 120 stores the control data corresponding to the first command data. In more detail, when the decoder 110 determines that the command data read from the memory 10 is the first command data, the control data corresponding to the first command data is set in the control register 120.

The control data corresponding to the second command data is stored in the buffer 130. In more detail, when the decoder 110 determines that the command data read from the memory 10 is the second command data, the control data corresponding to the second command data is set in the buffer 130.

The output adjustment circuit 140 reads the control data stored in the buffer 130 based on the value set in the control register 120, and outputs the control data to the signal processing circuit 20. In this case, the control data stored in the memory region of the buffer 130 corresponding to the value set in the control register 120 is read. The output adjustment circuit 140 outputs the control data read from the buffer 130 to the signal processing circuit 20 in synchronization with a data fetch signal of which at least one of output timing and permission/rejection of inversion output is set based on the value set in the control register 120.

The output timing of the data fetch signal may be referred to as a delay time from a reference point of time (reference timing). The delay time may be associated with the number of given clock signals. The delay time is set based on the value set in the control register 120. The permission/rejection of inversion output of the data fetch signal means permission for non-inversion output of the data fetch signal or permission for inversion output of the data fetch signal. The output adjustment circuit 140 outputs the data fetch signal or its inverted signal based on the value set in the control register 120. Therefore, in the case of outputting the control data in synchronization with the data fetch signal, the control data can be output in synchronization with the rising edge or falling edge of the data fetch signal.

The output adjustment circuit 140 can output a clock signal generated based on the value set in the control register 120. In more detail, the output adjustment circuit 140 outputs the clock signal of which at least one of the frequency, phase, permission/rejection of inversion output, and output timing is set based on the value set in the control register 120 to the signal processing circuit 20.

The frequency of the clock signal may be referred to as the number of cycles of the clock signal per unit time. The phase of the clock signal may be referred to as the temporal difference from a reference clock signal at a certain point. The permission/rejection of inversion output of the clock signal means permission for non-inversion output of the clock signal or permission for inversion output of the clock signal. The output timing of the clock signal may be referred to as a delay time from a reference point of time. The delay time may be associated with the number of clock signals. The delay time is set based on the value set in the control register 120.

As described above, the signal output adjustment circuit 100 can adjust the output of the control data or clock signal to the signal processing circuit 20 based on the value set in the control register 120. The value set in the control register 120 and the control data are data corresponding to the command data stored in the memory 10. Therefore, the signal output adjustment circuit 100 may include a memory control circuit 170 for accessing the memory 10.

The memory 10 is desirably a nonvolatile memory. The control data or the clock signal can be output corresponding to the interface specification of the signal processing circuit 20 by storing the command data corresponding to the signal processing circuit 20 in the memory 10 in advance, and reading the command data from the memory 10 each time initialization occurs. The following description illustrates the case of using an electrically erasable programmable read only memory (EEPROM) in which data can be electrically rewritten as the memory 10.

Figure 4:
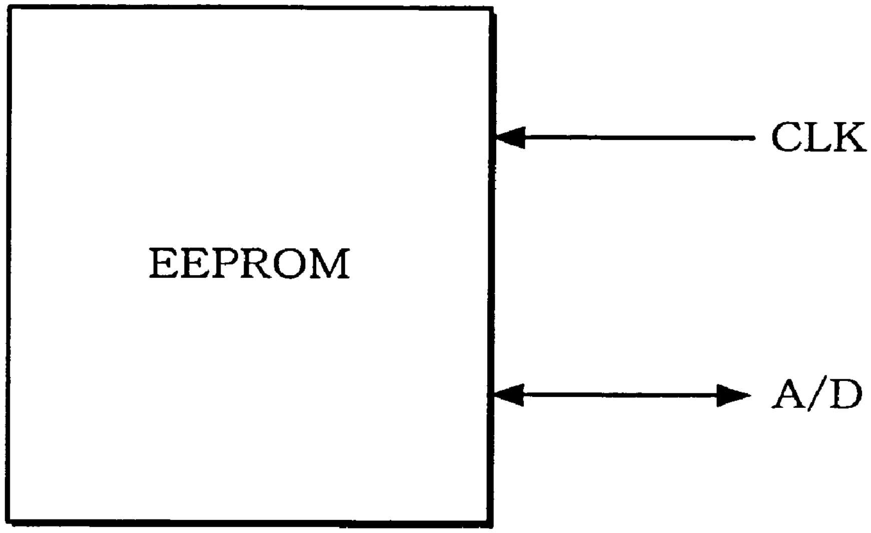
FIG. 4 is an explanatory diagram of an EEPROM.

FIG. 4 shows an explanatory diagram of the EEPROM. An address/data division bus and a clock line are connected with the EEPROM. The address/data division bus and the clock line are connected with the signal output adjustment circuit 100 (memory control circuit 170).

Figure 5:
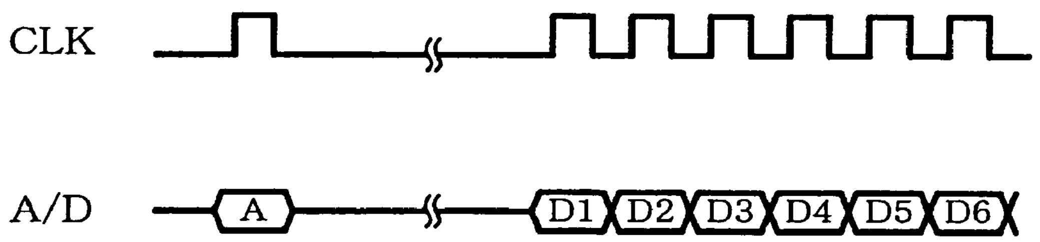
FIG. 5 is a timing diagram of an example of read control of an EEPROM.

FIG. 5 shows a timing diagram of an example of read control of the EEPROM.

The memory control circuit 170 outputs address data A to the address/data division bus and outputs one pulse of the clock signal to the clock line to set the address data A in the EEPROM. The address data A is the address on the memory space of the EEPROM in which the command data read by the memory control circuit 170 is stored.

The memory control circuit 170 then sequentially supplies the clock signal to the clock line. The EEPROM increments the fetched address data A in synchronization with the clock signal. The stored data (command data) corresponding to the address data A is output to the address/data division bus in synchronization with the clock signal on the clock line.

Figure 6:
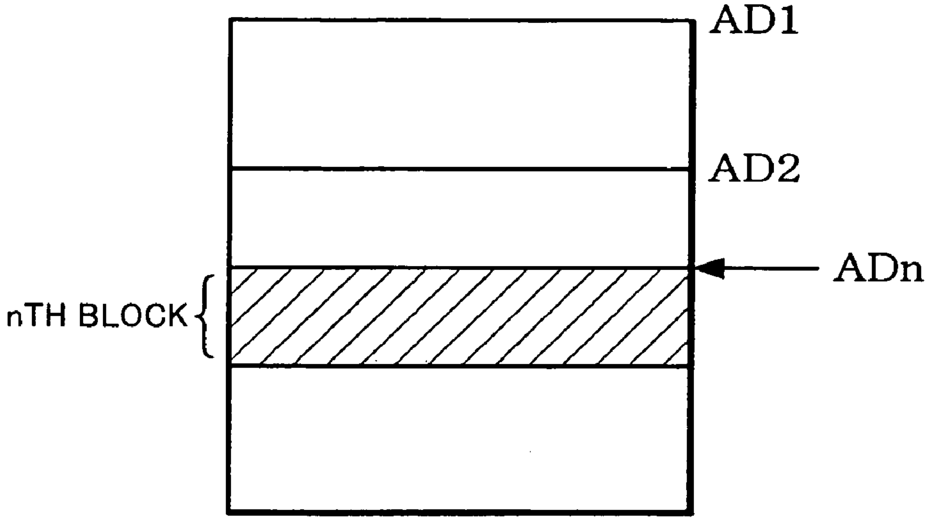
FIG. 6 is a view showing an example of a memory space of an EEPROM.

FIG. 6 shows an example of the memory space of the EEPROM.

The memory space of the EEPROM is divided into a plurality of blocks. Each block is specified by a head address. The first block is specified by a head address AD1. The second block is specified by a head address AD2. At least one piece of command data is stored in each block.

The memory control circuit 170 performs read control of the command data in block units. In the case of reading the command data stored in the nth block (n is a positive integer) specified by the head address ADn as shown in FIG. 6, the memory control circuit 170 outputs the address data of the head address ADn to the address/data division bus and outputs one pulse of the clock signal to the clock line to set the head address ADn in the EEPROM. The memory control circuit 170 then sequentially supplies the clock signal to the clock line. The EEPROM increments the fetched address data of the head address ADn in synchronization with the clock signal. The command data stored in the nth block specified by the head address ADn is output to the address/data division bus in synchronization with the clock signal on the clock line.

The decoder 110 shown in FIG. 3 sequentially decodes the command data read from the EEPROM by using the memory control circuit 170.

Figure 7:
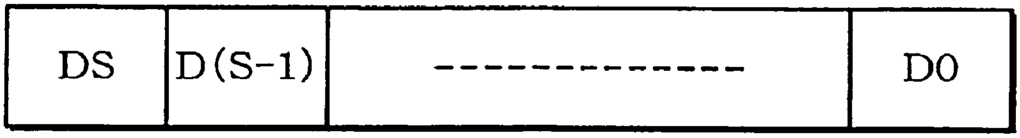
FIG. 7 is a view showing a configuration example of command data.

FIG. 7 shows a configuration example of the command data. In this example, the command data is read from the EEPROM in units of S bits (S is a positive integer).

FIG. 8 shows an example of the command data. FIG. 8 shows an example of the command data in the case where the signal output adjustment circuit 100 is applied to a display driver. Therefore, a power supply circuit or a scan driver may be considered as the signal processing circuit 20.

The command data includes an output regulation command (first command data) for setting the control data in the signal output adjustment circuit 100, and a signal output command (second command data) for outputting the control data to the signal processing circuit 20. At least one parameter in predetermined bit units may be set subsequent to the output regulation command or the signal output command.

The signal output command includes various commands for outputting the control data to a power supply circuit connected with the display driver, for example. The operation mode of the power supply circuit or the like can be set by using the signal output command. As examples of the signal output command, a power supply output command for designating ON/OFF of power supply output of the power supply circuit, a VCOM setting command for designating change timing of voltage applied to a common electrode which faces a pixel electrode in order to change the polarity of voltage applied to a liquid crystal based on a given voltage, a power supply sleep setting command for setting the power supply circuit in a sleep state, a boost clock setting command for designating the frequency of a boost clock signal of the power supply circuit, and the like can be given.

As examples of the output regulation command, various commands for setting the control data in the control register 120 can be given. The control data can be set to a power supply circuit or scan driver manufactured by another manufacturer and having a different interface specification by using the output regulation command.

The decoder 110 analyzes the command data having the configuration shown in FIG. 7 which is read from the EEPROM according to a command data table shown in FIG. 8 and determines whether the command data is the output regulation command or the signal output command. When the decoder 110 determines that the command data is the output regulation command, the control data corresponding to the command data (or parameter of the command data) is set in a first address region. When the decoder 110 determines that the command data is the signal output command, the control data corresponding to the command data (or parameter of the command data) is set in a second address region.

Each memory region of the control register 120 and the buffer 130 is specified by the address. The memory region of the control register 120 is assigned to the first address region. The memory region of the buffer 130 is assigned to the second address region. Therefore, when the decoder 110 determines that the command data is the output regulation command, the control data corresponding to the command data (or parameter of the command data) is set in the memory region of the control register 120. When the decoder 110 determines that the command data is the signal output command, the control data corresponding to the command data (or parameter of the command data) in the memory region of the buffer 130.

Figure 9:
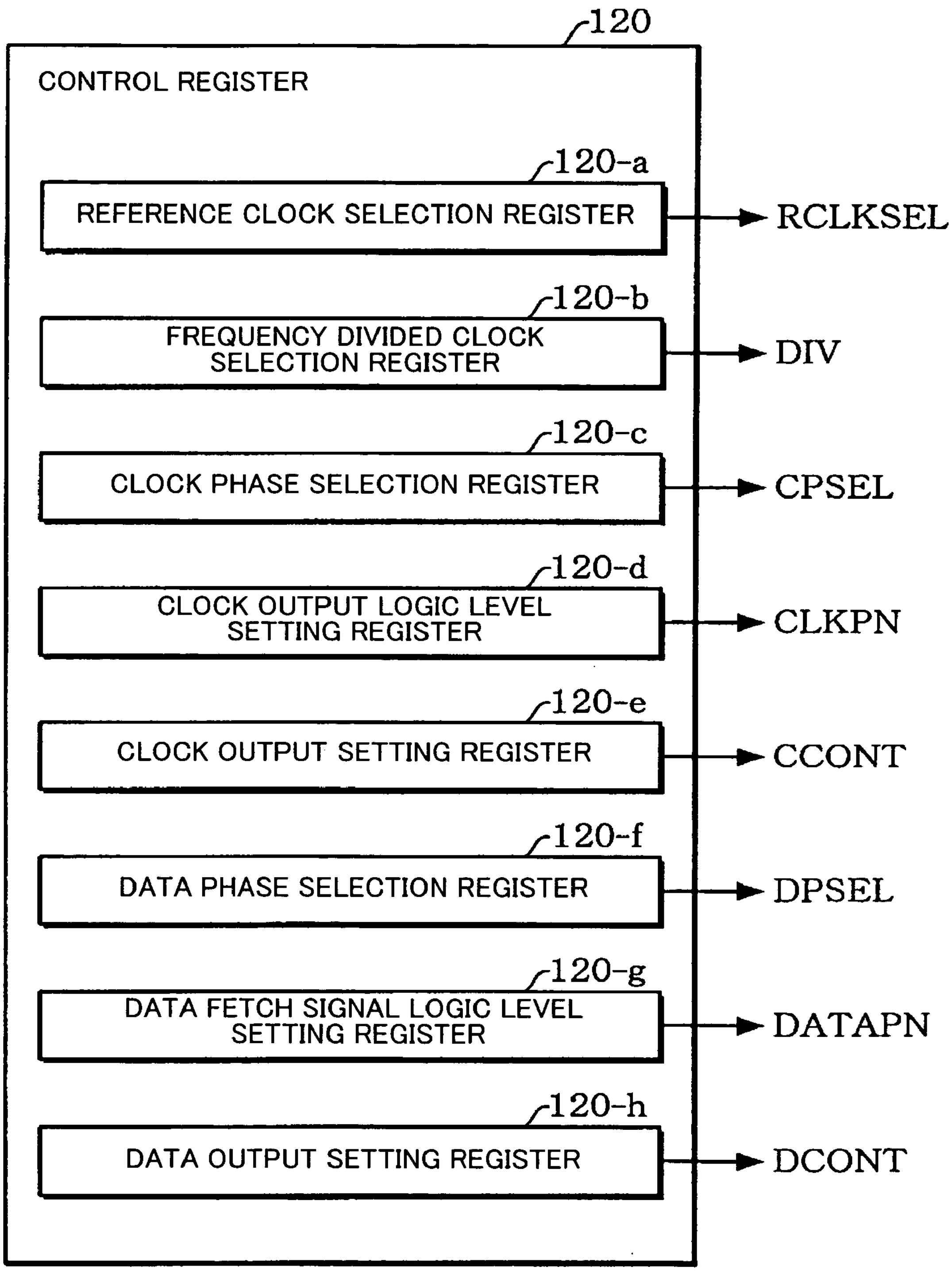
FIG. 9 is a diagram showing an outline of a configuration of a control register.

FIG. 9 shows an outline of a configuration of the control register 120.

The control register 120 includes a reference clock selection register 120-*a*, a frequency divided clock selection register 120-*b*, a clock phase selection register 120-*c*, a clock output logic level setting register 120-*d*, a clock output setting register 120-*e*, a data phase selection register 120-*f*, a data fetch signal logic level setting register 120-*g*, and a data output setting register 120-*h*. An inherent address is assigned to each register in the first address region, and the control data corresponding to the command data is set based on the decode result of the decoder 110.

For example, based on a reference clock setting command shown in FIG. 8, a value corresponding to the command or the parameter of the command is set in the reference clock selection register 120-*a*. The setting command or the parameter of the command may be called the command data. The control register 120 outputs a reference clock selection signal RCLKSEL corresponding to the value set in the reference clock selection register 120-*a*.

Based on a frequency divided clock setting command, a value corresponding to the command or the parameter of the command is set in the frequency divided clock selection register 120-*b*. The control register 120 outputs a frequency divided clock selection signal DIV corresponding to the value set in the frequency divided clock selection register 120-*b*.

Based on a clock phase selection command, a value corresponding to the command or the parameter of the command is set in the clock phase selection register 120-*c*. The control register 120 outputs a clock phase selection signal CPSEL corresponding to the value set in the clock phase selection register 120-*c*.

Based on a clock output logic level setting command, a value corresponding to the command or the parameter of the command is set in the clock output logic level setting register 120-*d*. The control register 120 outputs a clock output logic level setting signal CLKPN corresponding to the value set in the clock output logic level setting register 120-*d*.

Based on a clock output setting command, a value corresponding to the command or the parameter of the command is set in the clock output setting register 120-*e*. The control register 120 outputs a clock output setting signal CCONT corresponding to the value set in the clock output setting register 120-*e*.

Based on a data phase selection command, a value corresponding to the command or the parameter of the command is set in the data phase selection register 120-*f*. The control register 120 outputs a data phase selection signal DPSEL corresponding to the value set in the data phase selection register 120-*f*.

Based on a data fetch signal logic level setting command, a value corresponding to the command or the parameter of the command is set in the data fetch signal logic level setting register 120-*g*. The control register 120 outputs a data fetch signal logic level setting signal DATAPN corresponding to the value set in the data fetch signal logic level setting register 120-*g*.

Based on a data output setting command, a value corresponding to the command or the parameter of the command is set in the data output setting register 120-*h*. The control register 120 outputs a data output setting signal DCONT corresponding to the value set in the data output setting register 120-*h*.

The reference clock selection signal RCLKSEL, the frequency divided clock selection signal DIV, the clock phase selection signal CPSEL, the clock output logic level setting signal CLKPN, the clock output setting signal CCONT, the data phase selection signal DPSEL, the data fetch signal logic level setting signal DATAPN, and the data output setting signal DCONT are supplied to the output adjustment circuit 140.

Figure 10:
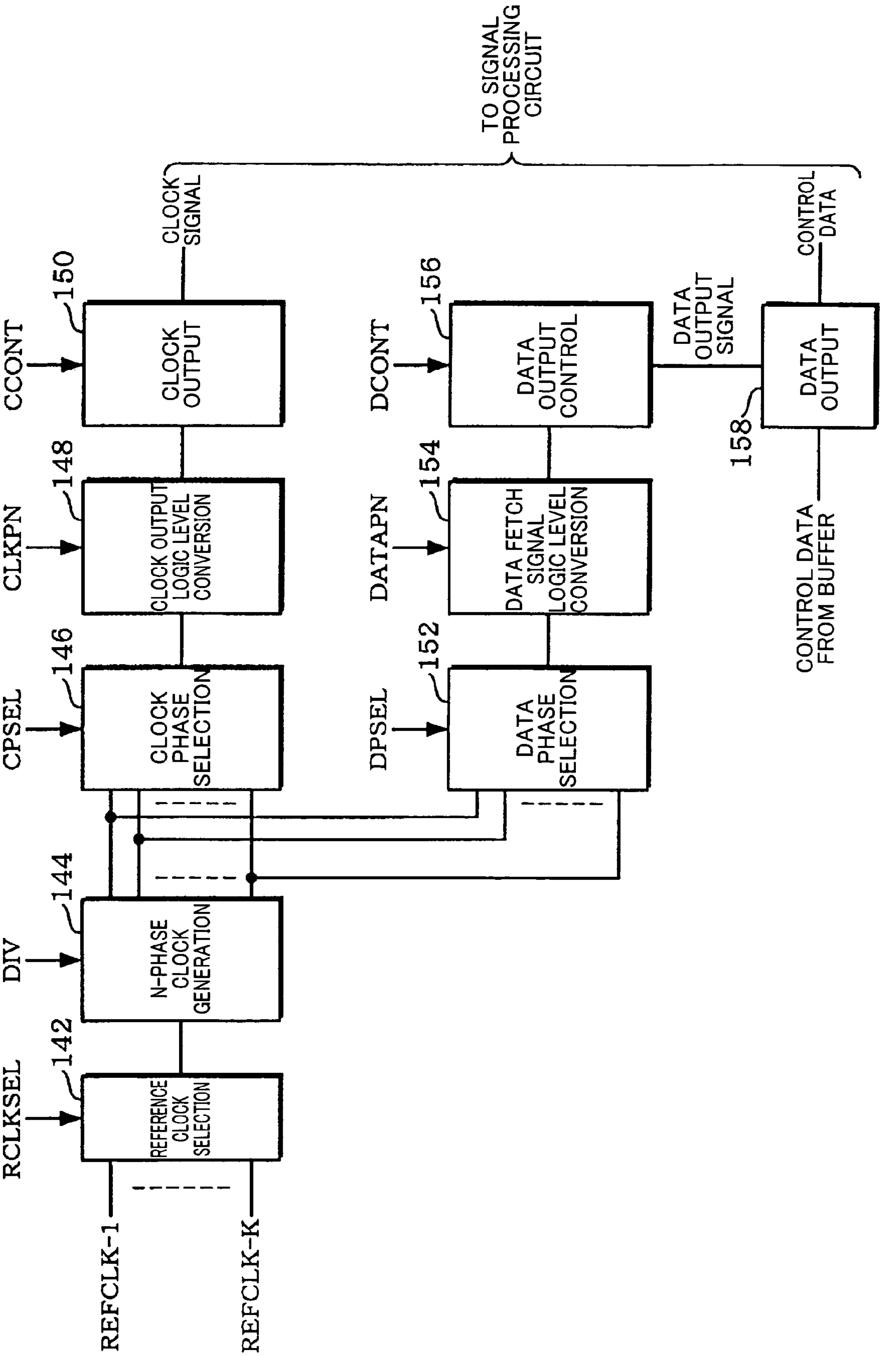
FIG. 10 is a block diagram showing an outline of a configuration of an output adjustment circuit.

FIG. 10 shows an outline of a configuration of the output adjustment circuit 140.

The output adjustment circuit 140 includes a reference clock selection circuit 142, an N-phase clock generation circuit 144 (N is an integer of two or more), a clock phase selection circuit 146, a clock output logic level conversion circuit 148, a clock output circuit 150, a data phase selection circuit 152, a data fetch signal logic level conversion circuit 154, a data output control circuit 156, and a data output circuit 158.

The reference clock selection circuit 142 selects one of a plurality of reference clock signals having different frequencies based on the reference clock selection signal RCLKSEL (based on the value set in the control register 120 in a broad sense).

The N-phase clock generation circuit 144 generates N-phase clock signals of different phases based on a frequency-divided clock signal generated by dividing the frequency of the reference clock selected by the reference clock selection circuit 142. The N-phase clock signals generated by the N-phase clock generation circuit 144 are supplied to the clock phase selection circuit 146 and the data phase selection circuit 152.

The N-phase clock generation circuit 144 may generate N-phase clock signals of different phases based on a frequency-divided clock signal generated by dividing the frequency of the reference clock selected by the reference clock selection circuit 142 at a dividing ratio set based on the frequency divided clock selection signal DIV (based on the value set in the control register 120 in a broad sense).

The clock phase selection circuit 146 selects one of the phase clock signals of different phases based on the clock phase selection signal CPSEL (based on the value set in the control register 120 in a broad sense). In more detail, the clock phase selection circuit 146 selects one of the N-phase clock signals generated by the N-phase clock generation circuit 144 based on the clock phase selection signal CPSEL.

The clock output logic level conversion circuit 148 outputs the phase clock signal selected by the clock phase selection circuit 146 or its inverted signal based on the clock output logic level setting signal CLKPN (based on the value set in the control register 120 in a broad sense).

The clock output circuit 150 delays the phase clock signal selected by the clock phase selection circuit 146 or its inverted signal for a period corresponding to the clock output setting signal CCONT (for a period corresponding to the value set in the control register 120 in a broad sense), and outputs the delayed signal. The signal output from the clock output circuit 150 is the clock signal supplied to the power supply circuit (signal processing circuit 20).

The data phase selection circuit 152 selects one of a plurality of phase clock signals of different phases based on the data phase selection signal DPSEL (based on the value set in the control register 120 in a broad sense). In more detail, the data phase selection circuit 152 selects one of the N-phase clock signals generated by the N-phase clock generation circuit 144 based on the data phase selection signal DPSEL.

The data fetch signal logic level conversion circuit 154 outputs the phase clock signal selected by the data phase selection circuit 152 or its inverted signal based on the data fetch signal logic level setting signal DATAPN (based on the value set in the control register 120 in a broad sense).

The data output control circuit 156 delays the phase clock signal selected by the data phase selection circuit 152 or its inverted signal for a period corresponding to the data output setting signal DCONT (for a period corresponding to the value set in the control register 120 in a broad sense), and outputs the delayed signal. The signal output from the data output control circuit 156 is the data fetch signal supplied to the data output circuit 158.

The data output circuit 158 outputs the control data read from the buffer 130 in synchronization with the data fetch signal. The signal output from the data output circuit 158 is the control data supplied to the power supply circuit (signal processing circuit 20).

In the output adjustment circuit 140, a clock signal having a frequency corresponding to the value set in the control register 120 can be supplied to the signal processing circuit 20 by the reference clock selection circuit 142. A clock signal having a phase corresponding to the value set in the control register 120 can be supplied to the signal processing circuit 20 by the clock phase selection circuit 146. The non-inversion output or inversion output of the clock signal can be supplied to the signal processing circuit 20 by the clock output logic level conversion circuit 148 corresponding to the value set in the control register 120. A clock signal which is delayed from the reference timing for a period corresponding to the value set in the control register 120 can be supplied to the signal processing circuit 20 by the clock output circuit 150.

The control data in synchronization with the data fetch signal having a phase corresponding to the value set in the control register 120 can be supplied to the signal processing circuit 20 by the data phase selection circuit 152. The control data in synchronization with the non-inversion output or inversion output of the data fetch signal corresponding to the value set in the control register 120 can be supplied to the signal processing circuit 20 by the data fetch signal logic level conversion circuit 154. The control data which is delayed from the reference timing for a period corresponding to the value set in the control register 120 can be supplied to the signal processing circuit 20 by the data output control circuit 156.

Therefore, a signal output adjustment circuit which generalizes the device by absorbing the difference in AC characteristics from other devices can be provided.

The output adjustment circuit 140 shown in FIG. 10 may have a configuration in which some of the above-described circuits are omitted. In this case, the output of the control data or the clock signal can be adjusted by the remaining circuits.

2. Display Driver

The case where the signal output adjustment circuit 100 in the present embodiment is applied to a display driver is described below.

Figure 11:
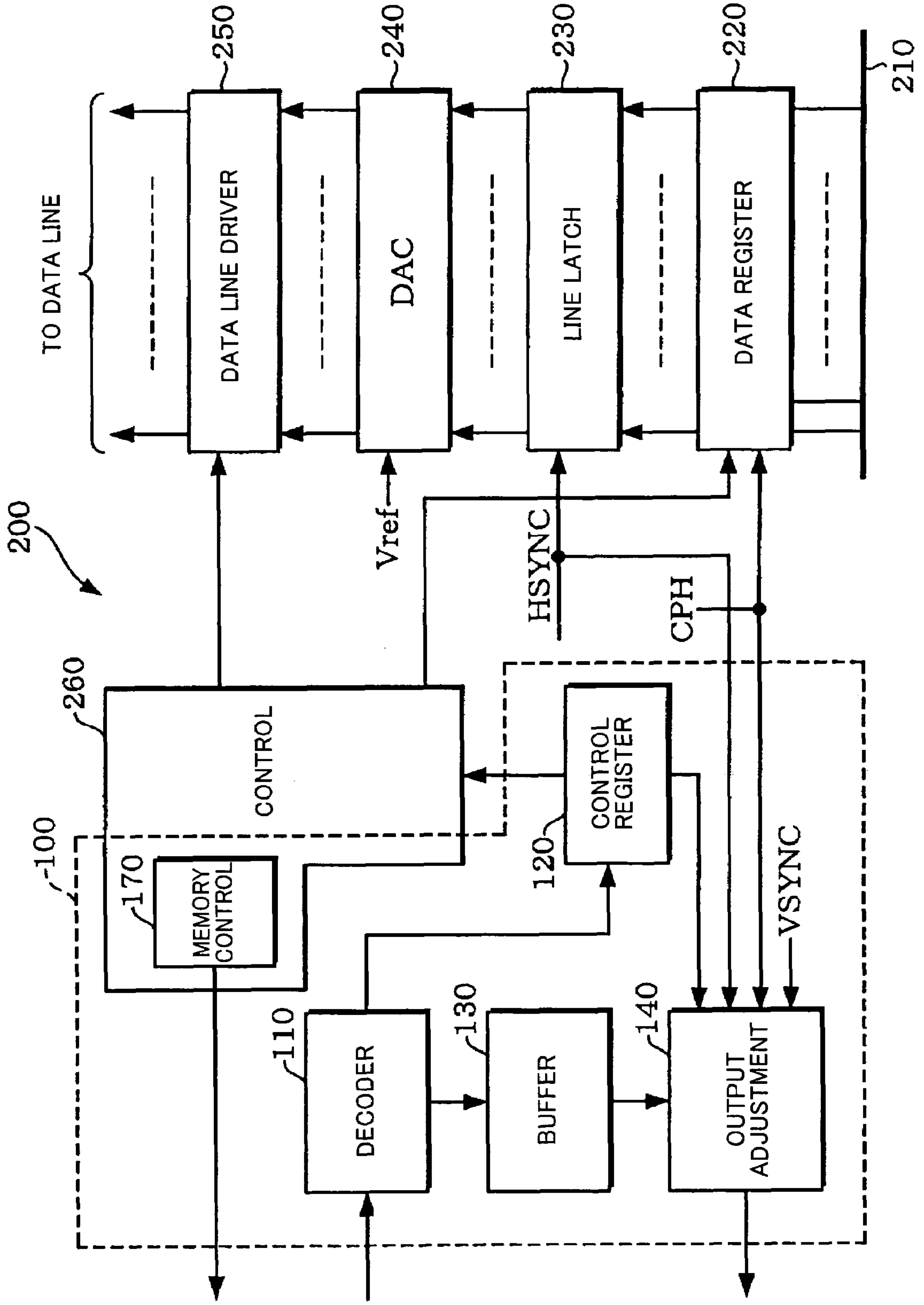
FIG. 11 is a block diagram showing an outline of a configuration of a display driver to which a signal output adjustment circuit in an embodiment of the present invention is applied.

FIG. 11 shows an outline of a configuration of a display driver to which the signal output adjustment circuit 100 in the present embodiment is applied. In FIG. 11, sections the same as the sections of the signal output adjustment circuit 100 shown in FIG. 3 are denoted by the same symbols. Description of these sections is appropriately omitted.

A display driver 200 includes the signal output adjustment circuit 100, a display data bus 210, a data register 220, a line latch 230, a digital-to-analog converter (DAC) 240 (voltage selection circuit in a broad sense), a data line driver circuit 250, and a control circuit 260.

Display data for driving a data line is supplied to the display data bus 210. The display data which is serially input in pixel units in synchronization with a given dot clock signal CPH is supplied to the display data bus 210. The display data is supplied from a display controller.

The data register 220 fetches the display data on the display data bus 210 based on the dot clock signal CPH. The data register 220 is formed by shift registers. The data register 220 fetches the display data on the display data bus 210 in pixel units based on the dot clock signal CPH which specifies shift timing of the shift registers.

The line latch 230 latches the display data fetched by the data register 220 based on a horizontal synchronization signal HSYNC. The horizontal synchronization signal is a signal which determines one horizontal scan period.

The DAC 240 outputs a drive voltage (gray-scale voltage) corresponding to the display data from the line latch 230 in data line units from a plurality of reference voltages, each of which corresponds to the display data. In more detail, the DAC 240 decodes the display data from the line latch 230, and selects one of the reference voltages based on the decode result. The reference voltage selected by the DAC 240 is output to the data line driver circuit 250 as the drive voltage.

The data line driver circuit 250 includes a plurality of data output sections, each of which is provided corresponding to one data line output terminal. The data output section of the data line driver circuit 250 drives the data line based on the drive voltage output from the DAC 240. The data output section includes a voltage-follower-connected operational amplifier of which the output is connected with the data line.

The control circuit 260 has the function of the memory control circuit 170, and controls the signal output adjustment circuit 100, the data register 220, the line latch 230, the DAC 240, and the data line driver circuit 250. The control circuit 260 controls these circuits based on the value set in the control register 120.

The control circuit 260 controls the data output section of the data line driver circuit 250 relating to ON/OFF of data line drive based on the value set in the control register 120. The control circuit 260 controls the shift direction of the shift registers which make up the data register 220 based on the value set in the control register 120 to control the fetch direction of the display data. The value is set in the control register 120 based on the decode result of the command data read from the EEPROM in the same manner as described above.

The output adjustment circuit 140 of the signal output adjustment circuit 100 shown in FIG. 11 uses a display system clock signal as a reference clock signal, and adjusts the output of the control data or the clock signal by using the reference clock signal. As the display system clock signal, the dot clock signal CPH, the horizontal synchronization signal HSYNC, and a vertical synchronization signal VSYNC which determines one vertical scan period can be given.

Figure 12:
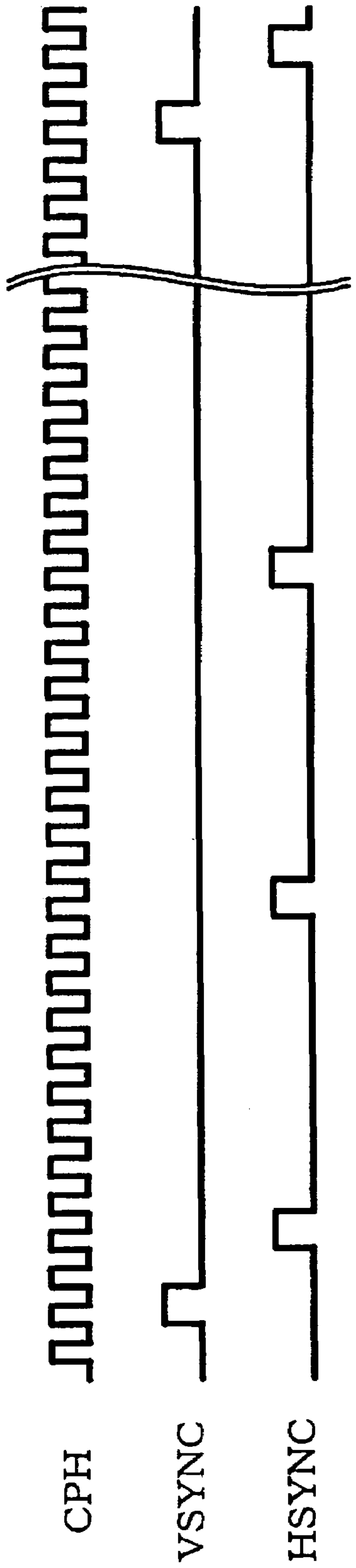
FIG. 12 is a timing diagram schematically showing a dot clock signal, a horizontal synchronization signal, and a vertical synchronization signal.

FIG. 12 schematically shows the dot clock signal CPH, the horizontal synchronization signal HSYNC, and the vertical synchronization signal VSYNC.

The dot clock signal CPH is a clock signal at several MHz, for example. The display controller which supplies the display data to the display driver 200 serially outputs the display data in pixel units in synchronization with the dot clock signal CPH.

The frequency of the horizontal synchronization signal HSYNC is determined depending on the number of data lines to be driven. The horizontal synchronization signal HSYNC is a clock signal at several KHz, for example. The vertical synchronization signal VSYNC is a clock signal at 60 Hz, for example.

A specific configuration example of the output adjustment circuit 140 of the signal output adjustment circuit 100 applied to the display driver 200 is described below. The following description is given on the assumption that the output adjustment circuit 140 uses the dot clock signal CPH, the horizontal synchronization signal HSYNC, and the vertical synchronization signal VSYNC as the reference clock signals, and N is four.

Figure 13:
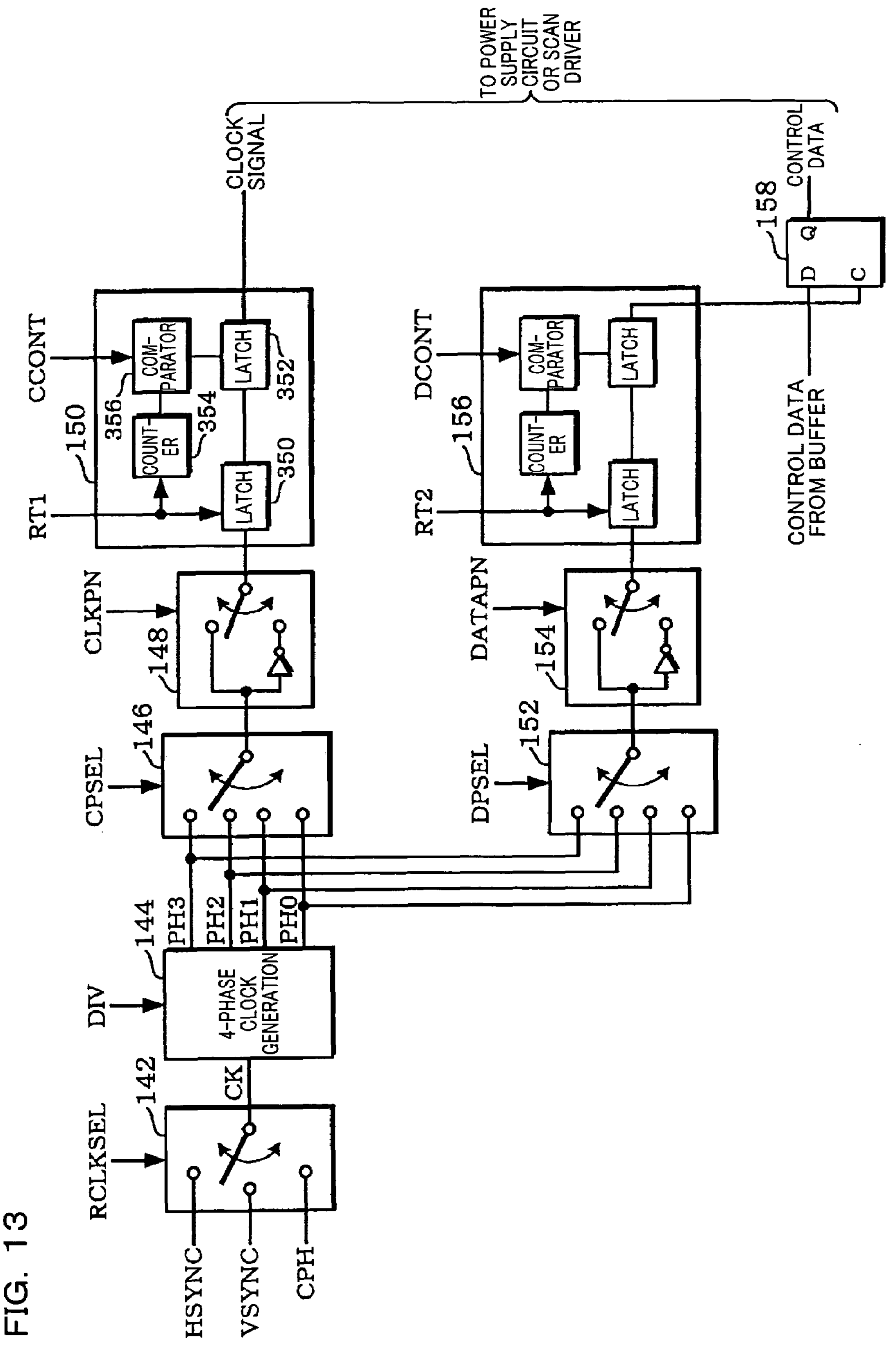
FIG. 13 is a block diagram of a configuration example of an output adjustment circuit.

FIG. 13 shows a configuration example of the output adjustment circuit 140. In FIG. 13, sections the same as the sections of the output adjustment circuit 140 shown in FIG. 10 are denoted by the same symbols. Description of these sections is appropriately omitted.

In FIG. 13, the reference clock selection circuit 142 selects one of the dot clock signal CPH, the horizontal synchronization signal HSYNC, and the vertical synchronization signal VSYNC based on the reference clock selection signal RCLKSEL, and outputs the selected signal as a selected reference clock signal CK. A 4-phase clock generation circuit 144 generates four phases of phase clock signals PH0 to PH3 of different phases based on a frequency-divided clock signal generated by dividing the frequency of the selected reference clock signal CK. The 4-phase clock generation circuit 144 uses the frequency-divided clock signal generated by dividing the frequency of the selected reference clock signal CK at a dividing ratio corresponding to the frequency divided clock selection signal DIV.

Figure 14:
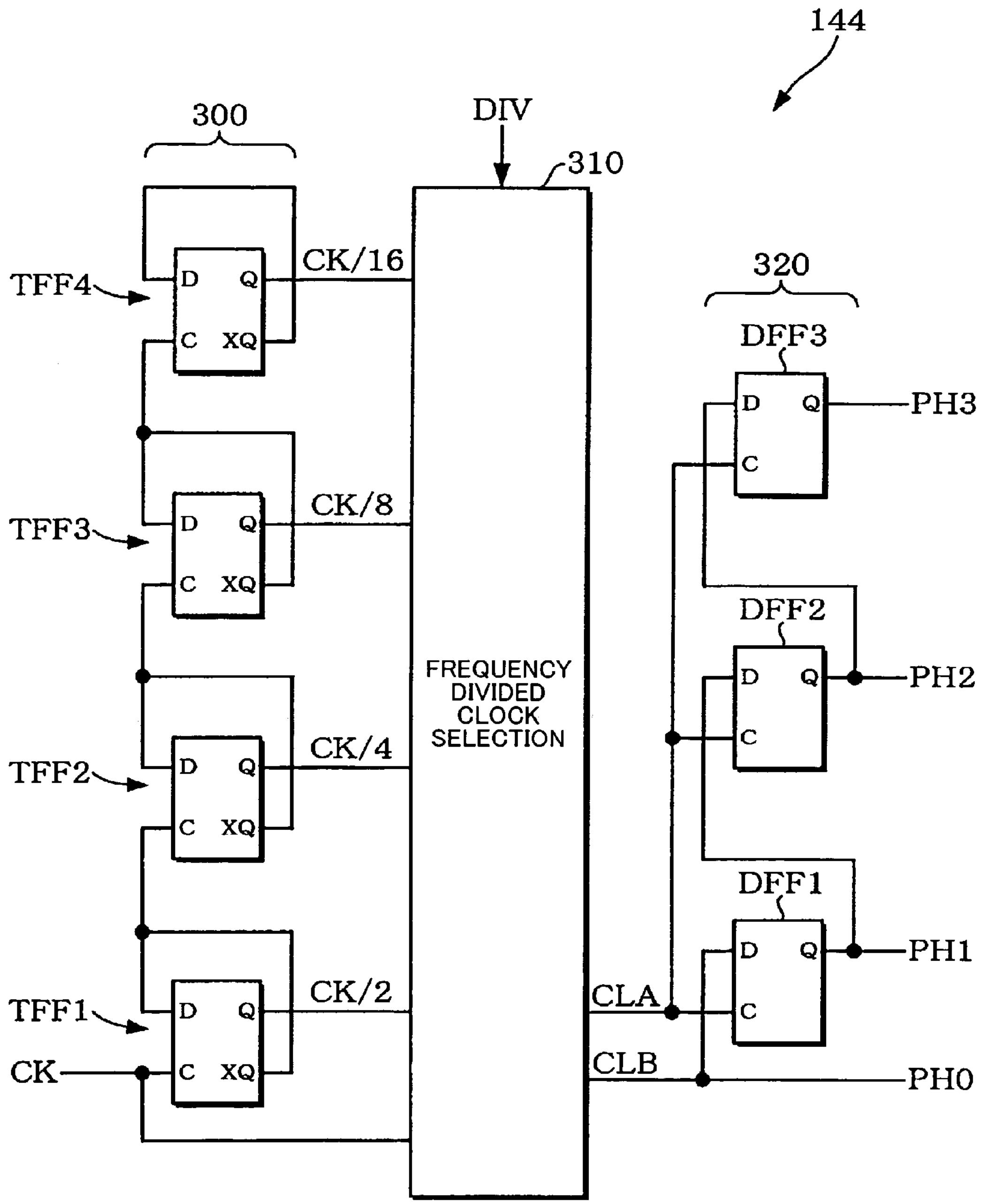
FIG. 14 is a block diagram of a configuration example of a 4-phase clock generation circuit.

FIG. 14 shows a configuration example of the 4-phase clock generation circuit 144.

The 4-phase clock generation circuit 144 includes a frequency divider circuit 300 which divides the frequency of the selected reference clock signal CK by four, a frequency divided clock selection circuit 310, and a phase generation circuit 320.

The frequency divider circuit 300 includes four T flip-flops TFF1 to TFF4. The T flip-flop TFF1 outputs a ½ frequency-divided clock signal (CK/2) generated by dividing the frequency of the selected reference clock signal CK. The T flip-flop TFF2 outputs a ¼ frequency-divided clock signal (CK/4) generated by dividing the frequency of the ½ frequency-divided clock signal (CK/2). The T flip-flop TFF3 outputs a ⅛ frequency-divided clock signal (CK/8) generated by dividing the frequency of the ¼ frequency-divided clock signal (CK/4). The T flip-flop TFF4 outputs a 1/16 frequency-divided clock signal (CK/16) generated by dividing the frequency of the ⅛ frequency-divided clock signal (CK/8). The selected reference clock signal CK and the frequency-divided clock signals (CK/2, CK/4, CK/8, CK/16) are supplied to the frequency divided clock selection circuit 310.

The frequency divided clock selection circuit 310 selects first and second selected frequency-divided clock signals CLA and CLB based on the frequency divided clock selection signal DIV.

FIG. 15 shows a truth table of an operation example of the frequency divided clock selection circuit 310. The dividing ratio is determined by the frequency divided clock selection signal DIV. When the dividing ratio determined by the frequency divided clock selection signal DIV is one, the selected reference clock signal CK and the ¼ frequency-divided clock signal (CK/4) are selected as the first and second frequency-divided clock signals CLA and CLB, respectively. When the dividing ratio determined by the frequency divided clock selection signal DIV is two or four, the frequency-divided clock signals are selected as the first and second frequency-divided clock signals CLA and CLB as shown in FIG. 15.

In FIG. 14, the phase generation circuit 320 includes three D flip-flops DFF1 to DFF3. The second frequency-divided clock signal CLB is the phase clock signal PH0. The D flip-flop DFF1 generates the phase clock signal PH1 by synchronizing the second frequency-divided clock signal CLB with the first selected frequency-divided clock signal CLA. The D flip-flop DFF2 generates the phase clock signal PH2 by synchronizing the phase clock signal PH1 with the first selected frequency-divided clock signal CLA. The D flip-flop DFF3 generates the phase clock signal PH3 by synchronizing the phase clock signal PH2 with the first selected frequency-divided clock signal CLA.

Figure 16:
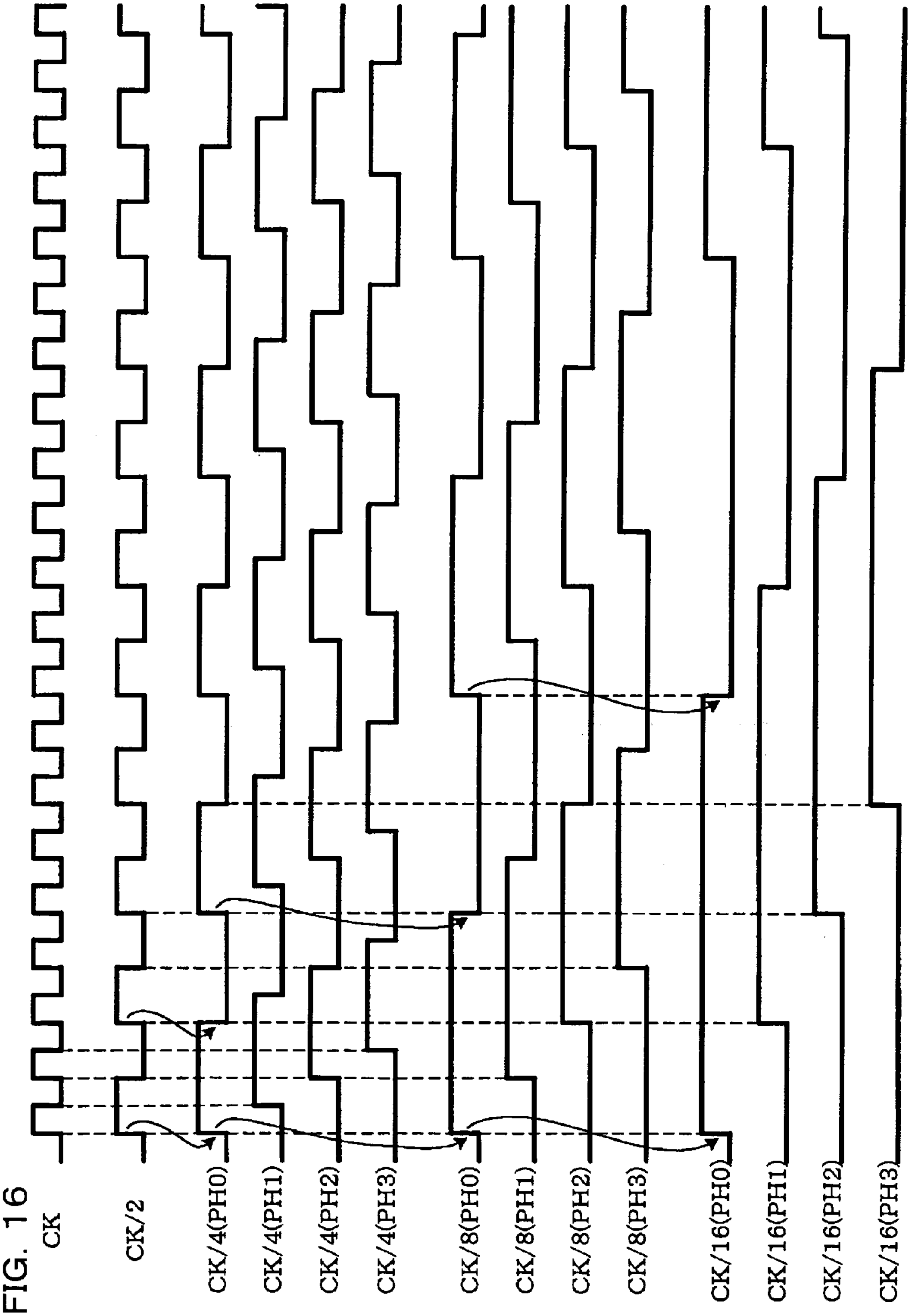
FIG. 16 is a timing diagram of an operation example of the 4-phase clock generation circuit shown in FIGS. 14 and 15.

FIG. 16 shows a timing diagram of an operation example of the 4-phase clock generation circuit shown in FIGS. 14 and 15. FIG. 16 shows a timing diagram of four phases of phase clock signals PH0 to PH3 in the case where one, two, or four is determined by the frequency divided clock selection signal DIV.

As shown in FIG. 13, the four phases of phase clock signals PH0 to PH3 are supplied to the clock phase selection circuit 146 and the data phase selection circuit 152.

A phase clock signal selected by the clock phase selection circuit 146 based on the clock phase selection signal CPSEL is supplied to the clock output logic level conversion circuit 148. The clock output logic level conversion circuit 148 supplies non-inversion output or inversion output of the clock signal output from the clock phase selection circuit 146 to the clock output circuit 150 corresponding to the clock output logic level setting signal CLKPN.

The clock output circuit 150 may include latches 350 and 352, a counter 354, and a comparator 356. The latch 350 latches the output from the clock phase selection circuit 146 based on a reference timing signal RT1. The counter 354 starts counting of the counter value based on the reference timing signal RT1, and counts the edges of an output CKO1 from the clock phase selection circuit 146. The comparator 356 compares the value determined by the clock output setting signal CCONT with the counter value of the counter 354. The comparator 356 outputs a pulse when these values coincide. The latch 352 latches the output from the latch 350 based on the pulse. The output from the latch 352 is output to the signal processing circuit 20 as a clock signal.

Figure 17:
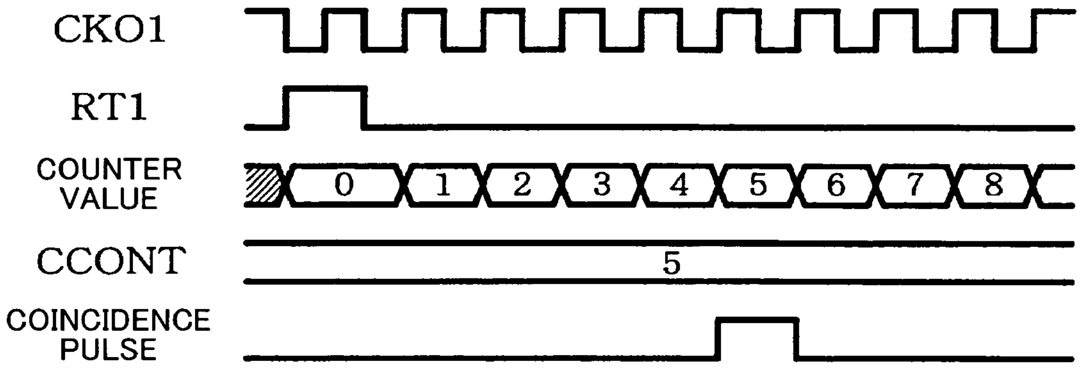
FIG. 17 is a timing diagram of an operation example of a clock output circuit.

FIG. 17 shows a timing diagram of an operation example of the clock output circuit 150. As shown in FIG. 17, the output from the clock output logic level conversion circuit 148 is delayed for a period until the value determined by the clock output setting signal CCONT coincides with the counter value of the counter 354.

In FIG. 13, the phase clock signal selected by the data phase selection circuit 152 based on the data phase selection signal DPSEL is supplied to the data fetch signal logic level conversion circuit 154. The data fetch signal logic level conversion circuit 154 supplies non-inversion output or inversion output of the clock signal output from the data phase selection circuit 152 to the data output control circuit 156 corresponding to the data fetch signal logic level setting signal DATAPN.

The data output control circuit 156 has the same configuration as that of the clock output circuit 150. The data output control circuit 156 outputs the data fetch signal generated by delaying the output from the data fetch signal logic level conversion circuit 154 based on the reference timing signal RT2 for a period until the value determined by the data output setting signal DCONT coincides with the counter value of the counter.

The data output circuit 158 is formed by a D flip-flop. The data output circuit 158 fetches the control data read from the buffer 130 in synchronization with the edge of the data fetch signal from the data output control circuit 156, and outputs the control data to the signal processing circuit 20.

The control data can be set to other devices having an interface specification differing from that of the display driver, such as the scan driver or the power supply circuit, based on the command data by providing a display driver having the function of the above-described signal output adjustment circuit, whereby system construction can be facilitated. Therefore, a generalized display driver which can absorb the difference in AC characteristics from other devices can be provided, whereby a reduction of cost can be achieved.

3. Application Example to Electro-Optical Device

An electro-optical device to which the display driver 200 shown in FIG. 11 is applied is described below. The following description is given taking a liquid crystal device as an example of an electro-optical device.

Figure 18:
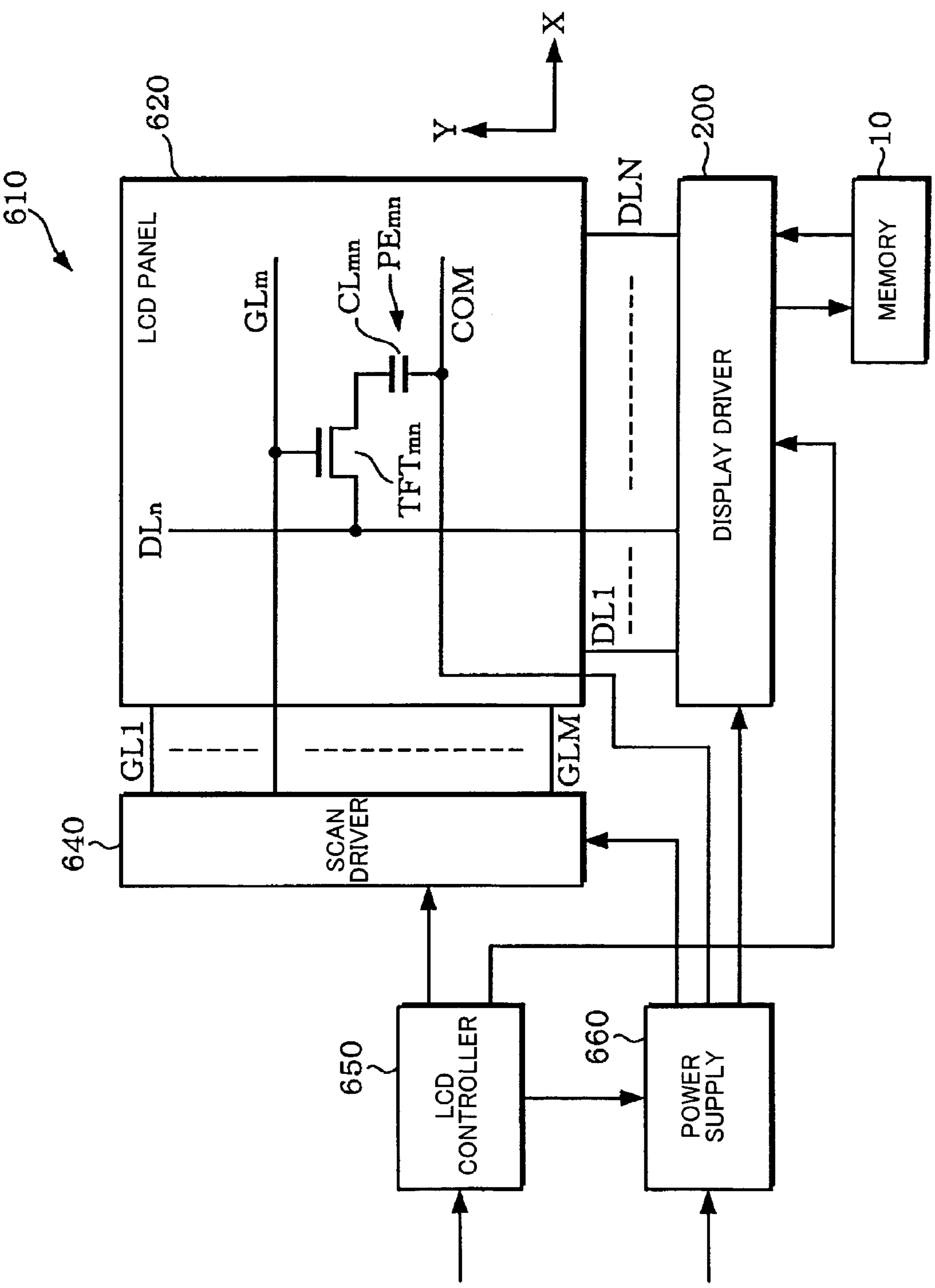
FIG. 18 is a diagram showing an outline of a configuration of an electro-optical device.

FIG. 18 shows an outline of a configuration of an electro-optical device. In FIG. 18, sections the same as the sections shown in FIGS. 1 and 11 are denoted by the same symbols. Description of these sections is appropriately omitted.

An electro-optical device may be incorporated into various electronic instruments such as a portable telephone, portable information instrument (PDA, etc.), digital camera, projector, portable audio player, mass storage device, video camera, electronic notebook, or global positioning system (GPS).

In FIG. 18, an electro-optical-device 610 includes a liquid crystal display (LCD) panel 620 (display panel or electro-optical panel in a broad sense), a display driver 200, a scan driver 640 (gate driver), an LCD controller 650 (display controller in a broad sense), and a power supply circuit 660.

The electro-optical-device 610 does not necessarily include all of these circuit blocks. The electro-optical-device 610 may have a configuration in which some of the circuit blocks are omitted.

The LCD panel 620 includes a plurality of scan lines (gate lines), each of the scan lines being provided in one of the rows, a plurality of data lines (source lines) which intersect the scan lines, each of the data lines being provided in one of the columns, and a plurality of pixels, each of the pixels being specified by one of the scan lines and one of the data lines. Each of the pixels includes a thin-film transistor (hereinafter abbreviated as "TFT") and a pixel electrode. The TFT is connected with the data line, and a pixel electrode is connected with the TFT.

In more detail, the LCD panel 620 is formed on a panel substrate such as a glass substrate. A plurality of scan lines GL1 to GLM (M is an integer of two or more; M is desirably three or more), arranged in the Y direction shown in FIG. 18 and extending in the X direction, and a plurality of data lines DL1 to DLN (N is an integer of two or more), arranged in the X direction and extending in the Y direction, are disposed on the panel substrate. A pixel PEmn is disposed at a position corresponding to the intersecting point of the scan line GLm ($1 \leqq m \leqq M$, m is an integer) and the data line DLn ($1 \leqq n \leqq N$, n is an integer). The pixel PEmn includes the thin-film transistor TFTmn and the pixel electrode.

A gate electrode of the thin-film transistor TFTmn is connected with the scan line GLm. A source electrode of the thin-film transistor TFTmn is connected with the data line DLn. A drain electrode of the thin-film transistor TFTmn is connected with the pixel electrode. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. The transmissivity of the pixel changes corresponding to the voltage applied between the pixel electrode and the common electrode COM. A voltage VCOM supplied to the common electrode COM is generated by the power supply circuit 660.

The LCD panel 620 is formed by attaching a first substrate on which the pixel electrode and the TFT are formed to a second substrate on which the common electrode is formed, and sealing a liquid crystal as an electro-optical material between the two substrates.

The display driver 200 drives the data lines DL1 to DLN of the LCD panel 620 based on display data for one horizontal scan period supplied in units of horizontal scan periods. In more detail, the display driver 200 drives at least one of the data lines DL1 to DLN based on the display data.

The scan driver 640 scans the scan lines GL1 to GLM of the LCD panel 620. In more detail, the scan driver 640 sequentially selects the scan lines GL1 to GLM in one vertical period, and drives the selected scan line.

The LCD controller 650 outputs control signals to the display driver 200, the scan driver 640, and the power supply circuit 660 according to the content set by a host such as a CPU (not shown). In more detail, the LCD controller 650 supplies an operation mode setting and a horizontal synchronization signal or a vertical synchronization signal generated therein to the display driver 200 and the scan driver 640, for example. The horizontal synchronization signal specifies the horizontal scan period. The vertical synchronization signal specifies the vertical scan period. The LCD controller 650 controls the power supply circuit 660 relating to polarity reversal timing of the voltage VCOM applied to the common electrode COM by using a polarity reversal signal POL.

The power supply circuit 660 generates various voltages applied to the LCD panel 620 and the voltage VCOM applied to the common electrode COM based on a reference voltage supplied from the outside.

The display driver 200 reads the command data stored in advance in the memory 10 after initialization, adjusts the output of the control data and the clock signal, and outputs various clock signals or sets various types of control data to the scan driver 640 and the power supply circuit 660. For example, the display driver 200 outputs the control data corresponding to at least one of the power supply output command, VCOM setting command, power supply sleep setting command, and boost clock setting command to the power supply circuit 660 to set the power supply circuit 660.

In FIG. 18, the electro-optical device 610 is configured to include the LCD controller 650. However, the LCD controller 650 may be provided outside the electro-optical device 610. The host (not shown) may be included in the electro-optical device 610 together with the LCD controller 650.

At least one of the scan driver 640, the LCD controller 650, and the power supply circuit 660 may be included in the display driver 200.

Figure 19:
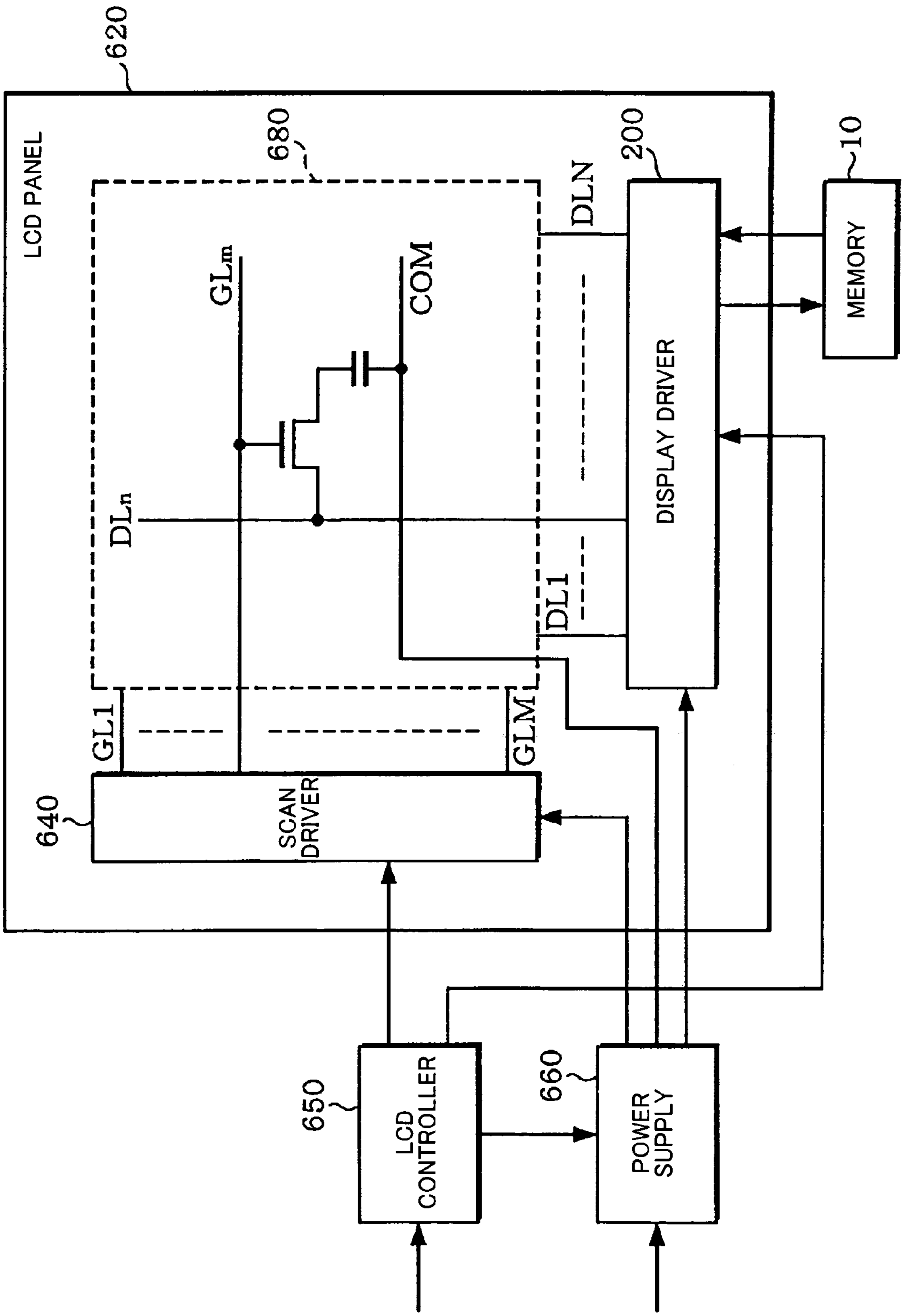
FIG. 19 is a diagram showing an outline of another configuration of an electro-optical device.

Some or the entirety of the display driver 200, the scan driver 640, the LCD controller 650, and the power supply circuit 660 may be formed on the LCD panel 620. In FIG. 19, the display driver 200 and the scan driver 640 are formed on the LCD panel 620. As described above, the LCD panel 620 may be configured to include a plurality of data lines, a plurality of scan lines, a plurality of pixels, each of the pixels being specified by one of the data lines and one of the scan lines, and a display driver which drives the data lines. The pixels are formed in a pixel formation region 680 of the LCD panel 620.

The present invention is not limited to the above-described embodiment. Various modifications and variations are possible within the spirit and scope of the present invention. For example, the present invention can be applied not only to drive of the LCD panel, but also to drive of an electroluminescent or plasma display device.

Part of requirements of a claim of the present invention could be omitted from a dependent claim which depends on that claim. Moreover, part of requirements of any independent claim of the present invention could be made to depend on any other independent claim.

What is claimed is:

1. A signal output adjustment circuit that adjusts output of control data corresponding to command data, the signal output adjustment circuit comprising:
- a decoder that decodes the command data read from a memory;
- a control register in which control data corresponding to first command data is set when the decoder determines that the command data is the first command data for setting control data;
- a buffer in which control data corresponding to second command data is stored when the decoder determines that the command data is the second command data for outputting control data; and
- an output adjustment circuit that reads the control data stored in the buffer and outputs the read control data in synchronization with a data fetch signal, based on a value set in the control register,
- the output adjustment circuit setting at least one of permission/rejection of inversion output of the data fetch signal and output timing of the data fetch signal, based on the value set in the control register, and
- the output adjustment circuit including
- a data phase selection circuit that selects one of a plurality of phase clock signals of different phases based on the value set in the control register,
- a data-signal-output-logic-level conversion circuit that outputs the one of the plurality of the phase clock signals selected by the data phase selection circuit or an inverted signal of the selected phase clock signal, based on the value set in the control register, and
- a data output control circuit that generates the data fetch signal by delaying output from the data-signal-output-logic-level conversion circuit for a period corresponding to the value set in the control register.

2. The signal output adjustment circuit as defined in claim 1,
- the data fetch signal being a signal in synchronization with a given clock signal, and
- the output adjustment circuit outputting the clock signal of which at least one of frequency, phase, permission/rejection of inversion output, and output timing is set based on the value set in the control register.

3. The signal output adjustment circuit as defined in claim 2,
- the output adjustment circuit including
- a clock output circuit that delays output from the clock-output-logic-level conversion circuit for a period corresponding to the value set in the control register, and outputs the delayed output as the clock signal.

4. The signal output adjustment circuit as defined in claim 1,
- the output adjustment circuit including
- a reference clock selection circuit that selects one of a plurality of reference clock signals having different frequencies based on the value set in the control register, and
- an N-phase clock generation circuit (N is an integer of two or more) that generates N-phase clock signals of different phases based on a frequency-divided clock signal generated by dividing a frequency of the one of the reference clock signals selected by the reference clock selection circuit, and
- the N-phase clock signals generated by the N-phase clock generation circuit being supplied to the data phase selection circuit.

5. The signal output adjustment circuit as defined in claim 4, the N-phase clock generation circuit generating the N-phase clock signals of different phases based on the frequency-divided clock signal generated by dividing the frequency of the one of the reference clock signals selected by the reference clock selection circuit at a dividing ratio that is set based on the value set in the control register.

6. A display driver that drives a data line of an electro-optical device based on display data, the display driver comprising:

a data register that fetches the display data based on a given dot clock signal, the display data being serially input in pixel units in synchronization with the dot clock signal;

a line latch that latches the display data fetched by the data register based on a horizontal synchronization signal that determines one horizontal scan period;

a data line driver circuit that drives the data line based on the display data latched by the line latch; and the signal output adjustment circuit as defined in claim 4, one of the reference clock signals being one of the dot clock signal, the horizontal synchronization signal, and a vertical synchronization signal that determines one vertical scan period.

7. The display driver as defined in claim 6, the output adjustment circuit outputting the control data, the one of the phase clock signals, or the inverted signal to at least one of a power supply circuit that provides a power supply of the electro-optical device and a scan driver that scans a scan line of the electro-optical device.

8. The signal output adjustment circuit as defined in claim 1, the memory being a nonvolatile memory.

9. A signal output adjustment circuit that adjusts output of a clock signal, the signal output adjustment circuit comprising:

a decoder that decodes command data read from a memory;

a control register in which control data corresponding to the command data is set based on a decoding result of the decoder; and an output adjustment circuit that outputs a clock signal based on a value set in the control register, the output adjustment circuit outputting the clock signal of which at least one of frequency, phase, permission/rejection of inversion output, and output timing is set based on the value set in the control register, and the output adjustment circuit including:

a clock phase selection circuit that selects one of a plurality of phase clock signals of different phases based on the value set in the control register, a clock-output-logic-level conversion circuit that outputs the one of the phase clock signals selected by the clock phase selection circuit or an inverted signal of the selected phase clock signal, based on the value set in the control register, and a clock output circuit that delays output from the clock-output-logic-level conversion circuit for a period corresponding to the value set in the control register, and outputs the delayed output as the clock signal.

10. The signal output adjustment circuit as defined in claim 9, the output adjustment circuit including:

a reference clock selection circuit that selects one of a plurality of reference clock signals having different frequencies based on the value set in the control register, and an N-phase clock generation circuit (N is an integer of two or more) that generates N-phase clock signals of different phases based on a frequency-divided clock signal generated by dividing a frequency of the one of the reference clock signals selected by the reference clock selection circuit, and the N-phase clock signals generated by the N-phase clock generation circuit being supplied to the clock phase selection circuit.

11. The signal output adjustment circuit as defined in claim 10, the N-phase clock generation circuit generating the N-phase clock signals of different phases based on the frequency-divided clock signal generated by dividing the frequency of the one of the reference clock signals selected by the reference clock selection circuit at a dividing ratio that is set based on the value set in the control register.

12. A display driver that drives a data line of an electro-optical device based on display data, the display driver comprising:

a data register that fetches the display data based on a given dot clock signal, the display data being serially input in pixel units in synchronization with the dot clock signal;

a line latch that latches the display data fetched by the data register based on a horizontal synchronization signal that determines one horizontal scan period;

a data line driver circuit that drives the data line based on the display data latched by the line latch; and the signal output adjustment circuit as defined in claim 10, one of the reference clock signals being one of the dot clock signal, the horizontal synchronization signal, and a vertical synchronization signal that determines one vertical scan period.

13. The display driver as defined in claim 12, the output adjustment circuit outputting the control data or the clock signal to at least one of a power supply circuit that provides a power supply of the electro-optical device and a scan driver that scans a scan line of the electro-optical device.

14. The signal output adjustment circuit as defined in claim 9, the memory being a nonvolatile memory.

* * * * *